(12) United States Patent
Rearden (10) Patent No.: US 12,377,389 B2
(45) Date of Patent: Aug. 5, 2025

(54) MODULAR DEVICES AND SYSTEMS FOR INFUSING GAS INTO A LIQUID AND METHODS OF MANUFACTURE AND USE THEREOF

(71) Applicant: BioTherm Hydronic, Inc., Cotati, CA (US)

(72) Inventor: Jim Rearden, Petaluma, CA (US)

(73) Assignee: BioTherm Hydronic, Inc., Cotati, CA (US)

(*) Notice: Subject to any disclaimer, the term of this patent is extended or adjusted under 35 U.S.C. 154(b) by 0 days.

(21) Appl. No.: 18/369,158

(22) Filed: Sep. 16, 2023

(65) Prior Publication Data

US 2024/0001311 A1    Jan. 4, 2024

Related U.S. Application Data

(62) Division of application No. 16/352,773, filed on Mar. 13, 2019, now abandoned.

(Continued)

(51) Int. Cl.
*B01F 23/23* (2022.01)
*B01F 23/231* (2022.01)
(Continued)

(52) U.S. Cl.
CPC ........ *B01F 23/23124* (2022.01); *B01F 35/10* (2022.01); *B01F 35/165* (2022.01);
(Continued)

(58) Field of Classification Search
CPC ............ B01F 3/04269; B01F 15/00922; B01F 2003/04404; B01F 2215/0052;
(Continued)

(56) References Cited

U.S. PATENT DOCUMENTS 3,979,190 A * 9/1976 Hedman ............. C01B 13/0251
96/7
4,268,279 A * 5/1981 Shindo ................. B01D 63/031
422/48

(Continued)

OTHER PUBLICATIONS

"Quick connect fitting" Wikipedia published Apr. 20, 2016 accessed at <https://en.wikipedia.org/w/index.php?title=Quick_connect_fitting&oldid=716288076> (Year: 2016).*

*Primary Examiner* — Stephen Hobson
(74) *Attorney, Agent, or Firm* — Derek J. Westberg, Esq.

(57) ABSTRACT

The present invention provides modular devices and systems for infusing gas into a liquid and methods of manufacture and use thereof. In accordance with an embodiment, a modular device for infusing gas into a liquid is provided. The modular device comprises a plurality of microporous hollow fibers, and a cap covering open ends of the microporous hollow fibers. The cap is configured to receive a gas into an opening and to deliver the gas into the open ends of the microporous hollow fibers. The cap is further configured to removably mount the modular device to a fixture. A system for infusing gas into a liquid may include one or more of the modular gas infusion devices configured to be removably mounted to a fixture such that the microporous hollow fibers are within a hollow cavity. The hollow cavity includes a first opening configured to receive a liquid and a second opening configured to discharge the liquid infused with a gas. Because the system is modular, it is economical to manufacture, scale to different application requirements and to maintain.

21 Claims, 9 Drawing Sheets

Related U.S. Application Data (60) Provisional application No. 62/643,321, filed on Mar. 15, 2018.

(51) Int. Cl.
*B01F 35/00* (2022.01)
*B01F 35/10* (2022.01)
*C02F 1/72* (2023.01)
B01D 53/22 (2006.01)
B01D 63/02 (2006.01)
B01F 23/236 (2022.01)
B01F 23/237 (2022.01)
B01F 101/00 (2022.01)

(52) U.S. Cl.
CPC ........ *C02F 1/727* (2013.01); *B01D 2053/224* (2013.01); *B01D 63/024* (2013.01); *B01F 23/231141* (2022.01); *B01F 23/231143* (2022.01); *B01F 23/231153* (2022.01); *B01F 23/231244* (2022.01); *B01F 23/231265* (2022.01); *B01F 23/2362* (2022.01); *B01F 23/237612* (2022.01); *B01F 2101/305* (2022.01)

(58) Field of Classification Search
CPC .. B01F 2003/04879; B01F 2003/04163; B01F 2003/04177; B01F 2003/04205; B01F 2003/04319; B01F 5/0478; B01F 5/0485; B01F 5/0486; B01F 5/0473; C02F 1/727; C02F 2201/006; C02F 3/208; C02F 7/00; Y02W 10/10
See application file for complete search history.

(56) References Cited

U.S. PATENT DOCUMENTS

| | | | | |
|---|---|---|---|---|
| 4,389,363 A * | 6/1983 | Molthop | ............ | B01D 63/0223 210/500.36 |
| 4,670,145 A * | 6/1987 | Edwards | ............ | B01D 63/043 96/9 |
| 4,931,186 A * | 6/1990 | Ford | ............ | B01D 61/18 210/636 |
| 4,975,247 A * | 12/1990 | Badolato | ............ | B01D 63/0221 210/321.74 |
| 5,059,374 A * | 10/1991 | Krueger | ............ | B01D 63/0233 264/254 |
| 5,137,631 A * | 8/1992 | Eckman | ............ | B01D 63/043 210/321.89 |
| 5,405,528 A * | 4/1995 | Selbie | ............ | B01D 63/046 210/232 |
| 5,470,469 A * | 11/1995 | Eckman | ............ | B01D 63/043 210/336 |
| 5,565,149 A * | 10/1996 | Page | ............ | B01D 61/00 261/DIG. 7 |
| 5,607,593 A * | 3/1997 | Cote | ............ | B01D 61/18 210/651 |
| 6,138,995 A * | 10/2000 | Page | ............ | B67D 1/1252 261/DIG. 7 |
| 6,149,817 A * | 11/2000 | Peterson | ............ | B01D 19/0031 210/321.78 |
| 6,511,602 B1 * | 1/2003 | Miyashita | ............ | B01D 61/18 210/636 |
| 7,083,726 B2 * | 8/2006 | Watanabe | ............ | B01D 71/34 210/321.78 |
| 7,104,530 B2 * | 9/2006 | Boye | ............ | B01D 39/04 261/95 |
| 7,104,531 B2 * | 9/2006 | Page | ............ | B67D 1/007 261/DIG. 7 |
| 7,481,927 B2 * | 1/2009 | Graham | ............ | B01D 63/101 210/232 |
| 7,537,200 B2 * | 5/2009 | Glassford | ............ | B01D 61/32 261/104 |
| 7,862,719 B2 * | 1/2011 | McMahon | ............ | B01D 65/08 210/240 |
| 7,879,229 B2 * | 2/2011 | Phagoo | ............ | B01D 65/08 210/195.3 |
| 7,938,966 B2 * | 5/2011 | Johnson | ............ | B01D 65/08 210/636 |
| 7,947,177 B2 * | 5/2011 | Eisberg | ............ | B01D 63/106 210/321.89 |
| 8,114,293 B2 * | 2/2012 | Phagoo | ............ | B01D 65/02 210/624 |
| 8,197,688 B2 * | 6/2012 | Sakashita | ............ | C02F 1/444 210/321.89 |
| 8,333,892 B2 * | 12/2012 | Greene | ............ | B01D 63/02 210/321.89 |
| 8,372,282 B2 * | 2/2013 | Zha | ............ | B01D 61/18 210/321.89 |
| 8,382,981 B2 * | 2/2013 | Rogers | ............ | B01D 69/10 29/469 |
| 8,808,540 B2 * | 8/2014 | Johnson | ............ | B01D 61/18 210/321.89 |
| 8,808,775 B2 * | 8/2014 | Novak | ............ | A47J 31/407 261/DIG. 7 |
| 9,022,224 B2 * | 5/2015 | Collignon | ............ | B01D 65/02 210/456 |
| 9,339,768 B2 * | 5/2016 | Taylor | ............ | B01D 19/0031 |
| 9,346,024 B2 * | 5/2016 | Page | ............ | B01F 23/2363 |
| 9,533,261 B2 * | 1/2017 | Teo | ............ | B01D 63/0221 |
| 9,662,614 B2 * | 5/2017 | de los Reyes | ......... | B01D 61/18 |
| 9,764,289 B2 * | 9/2017 | Swiatek | ............ | B01D 63/022 |
| 10,017,373 B2 * | 7/2018 | Kleinrichert | ......... | B01D 53/229 |
| 10,322,375 B2 * | 6/2019 | Swiatek | ............ | B01D 61/20 |
| 10,426,884 B2 * | 10/2019 | Labib | ............ | B01D 69/00 |
| 10,654,006 B1 * | 5/2020 | Rearden | ............ | B01F 23/23 |
| 10,933,386 B1 * | 3/2021 | Rearden | ............ | B01F 23/23 |
| 11,045,747 B2 * | 6/2021 | Tanizaki | ............ | B01D 19/00 |
| 2001/0027950 A1 * | 10/2001 | Rabie | ............ | B01D 63/031 210/636 |
| 2004/0045893 A1 * | 3/2004 | Watanabe | ............ | B01D 67/0027 210/321.89 |
| 2004/0188339 A1 * | 9/2004 | Murkute | ............ | B01D 61/18 210/321.79 |
| 2004/0232076 A1 * | 11/2004 | Zha | ............ | B01D 61/18 210/615 |
| 2006/0091074 A1 * | 5/2006 | Pedersen | ............ | B01D 63/031 210/744 |
| 2006/0175243 A1 * | 8/2006 | Mahendran | ............ | B01D 63/04 210/321.89 |
| 2007/0209993 A1 * | 9/2007 | Zha | ............ | B01D 63/02 210/251 |
| 2009/0020008 A1 * | 1/2009 | Wynn | ............ | B01D 63/046 95/45 |
| 2009/0026139 A1 * | 1/2009 | Zha | ............ | B01D 65/08 210/321.78 |
| 2009/0286318 A1 * | 11/2009 | Kauling | ............ | C12M 23/44 435/296.1 |
| 2011/0036240 A1 * | 2/2011 | Taylor | ............ | B01D 63/025 96/6 |
| 2015/0048019 A1 * | 2/2015 | Zhang | ............ | B01D 61/18 210/321.89 |
| 2016/0136590 A1 * | 5/2016 | Campbell | ............ | B01F 23/2319 261/119.1 |
| 2016/0317972 A1 * | 11/2016 | Matsumoto | .......... | B01D 65/003 |
| 2016/0346739 A1 * | 12/2016 | Panglisch | ............ | B01D 61/08 |
| 2017/0333850 A1 * | 11/2017 | Sabelfeld | ............ | B01F 25/31322 |
| 2018/0318777 A1 * | 11/2018 | Hartmann | ......... | B01F 23/23124 |
| 2019/0282971 A1 * | 9/2019 | Rearden | ............ | B01F 25/31425 |

* cited by examiner

MODULAR DEVICES AND SYSTEMS FOR INFUSING GAS INTO A LIQUID AND METHODS OF MANUFACTURE AND USE THEREOF

This application is a division of U.S. application Ser. No. 16/352,773, filed Mar. 13, 2019 and claims priority of U.S. Provisional Application No. 62/643,321, filed Mar. 15, 2018, the entire contents of each of which are hereby incorporated by reference.

BACKGROUND OF THE INVENTION

The present invention relates to the field of infusing gas into liquids.

There are a number of applications for infusing gas into liquids. For example, it is known that plants require water into order to receive nutrients into the plant. However, for the nutrients to be used by the plant, oxygen must also be present. It has been found that increasing the dissolved oxygen content of water used for irrigation can increase plant health as well as crop production yields. Additional applications for infusing gas into liquids can include, for example, aquaculture, distilled spirits production, and treatment of blood disorders.

Various techniques have been used to introduce gas into liquids, such as bubblers and aerators. In addition, porous membranes can be used at the gas-liquid interface to cause gas to be absorbed by, and removed from, liquids. For example, U.S. Pat. No. 4,268,279 discloses a gas transfer process using a hollow fiber membrane. More particularly, this patent discloses a process which comprises allowing a liquid to contact the inside of a microporous hollow fiber and a fluid to contact the outside, thereby allowing the gaseous components contained in both fluids to transfer between them.

In order to maximize the benefits of dissolving oxygen into water used for plant irrigation, it is desired to maximize the amount of dissolved oxygen as well as the time that the oxygen remains dissolved in the water. It is also desired to produce water having increased levels of dissolved oxygen in a manner that is both time-effective and cost-effective. Therefore, what is needed are improved devices and methods for infusing gas into a liquid and, more particularly, for infusing oxygen into water.

SUMMARY OF THE INVENTION

The present invention provides modular devices and systems for infusing gas into a liquid and methods of manufacture and use thereof. In accordance with an embodiment, a modular device for infusing gas into a liquid is provided. The modular device comprises plurality of microporous hollow fibers, and a cap covering open ends of the microporous hollow fibers. The cap is configured to receive a gas into an opening and to deliver the gas into the open ends of the microporous hollow fibers. The cap is further configured to removably mount the modular device to a fixture.

In accordance with a further embodiment, a modular system for infusing gas into a liquid is provided. The system includes a fixture comprising a hollow cavity, a first opening configured to receive a liquid, and a second opening configured to discharge the liquid infused with a gas. The system further comprises one or more modular gas infusion devices configured to be removably mounted to the fixture such that the microporous hollow fibers are within the hollow cavity.

These and other embodiments are described herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

The present invention is directed toward modular devices and systems for infusing gases into liquids and methods of manufacture and use thereof. A modular device (also referred herein as a "module") for infusing gas into liquid may include a plurality of microporous hollow fibers and a cap covering open ends of the microporous hollow fibers.

The microporous hollow fibers may be bundled together and surrounded by a mesh sleeve. In an embodiment, the microporous hollow fibers are water-repellant. The microporous hollow fibers may be folded or looped such that both ends of the fibers are open and covered by the cap. Alternatively, ends of the microporous hollow fibers that are opposite to those covered by the cap may be sealed or otherwise closed.

The cap covering open ends of the microporous hollow fibers is configured to receive a gas into an opening and to deliver the gas into the open ends of the microporous hollow fibers. The cap is preferably configured to removably mount the modular device to a fixture. For example, the cap may be fitted with tapered threads or a quick connect fitting.

A system for infusing gas into a liquid may include one or more of the modular devices and a fixture into which the modular devices can be mounted. In an embodiment, the modular devices can be removed from the fixture and replaced. This facilitates maintenance of the system, for example, to replace one or more of the modular devices that has failed or is otherwise no longer performing as desired.

An exemplary fixture is comprised of a hollow cavity, a first opening configured to receive a liquid, and a second opening configured to discharge liquid infused with gas. In such a configuration, the one or more modular gas infusion devices are mounted to the fixture such that the microporous hollow fibers are at least partially within the hollow cavity. The openings configured to receive gas are preferably accessible from outside the hollow cavity in order to facilitate delivery of gas to the modular devices. The fixture is preferably equipped with fittings to accommodate the modular devices; these fittings can be, for example, threaded or quick connect fittings.

In use, gas may be introduced into the opening of each of the modular devices. The gas may be delivered via a manifold, hoses or other gas delivery system. Liquid may also be introduced into the first opening of the fixture. The liquid can then make contact with the fibers. The gas can then cross the microporous membrane of the fibers and enter the liquid so that the gas becomes dissolved in the liquid. The gas can be, for example, primarily oxygen. Alternatively, other gasses may be used. Also, different gasses can be introduced via different ones of the modular devices so that multiple different gasses can be dissolved into the same liquid. The liquid can be, for example, primarily water. Alternatively, other liquids, including liquid mixtures and liquids with dissolved solids (e.g., plant fertilizers) may be used. The gas and/or the liquid can be pressure regulated. For example, the system can be controlled such that the gas has a greater pressure than that of the liquid. In an embodiment, the system can be used to increase the dissolved oxygen content of water.

Various different sizes, capacities and configurations of fixtures can be provided. This facilitates configuring and scaling of the system for different applications. The modular devices can be identical to each other, or similar to each other, regardless of fixture size, capacity, configuration or application. This allows a single, or limited number, of variations of modules to be used in a wide variety of applications, thereby simplifying manufacturing processes as well as maintenance and inventory requirements.

Figure 1A:
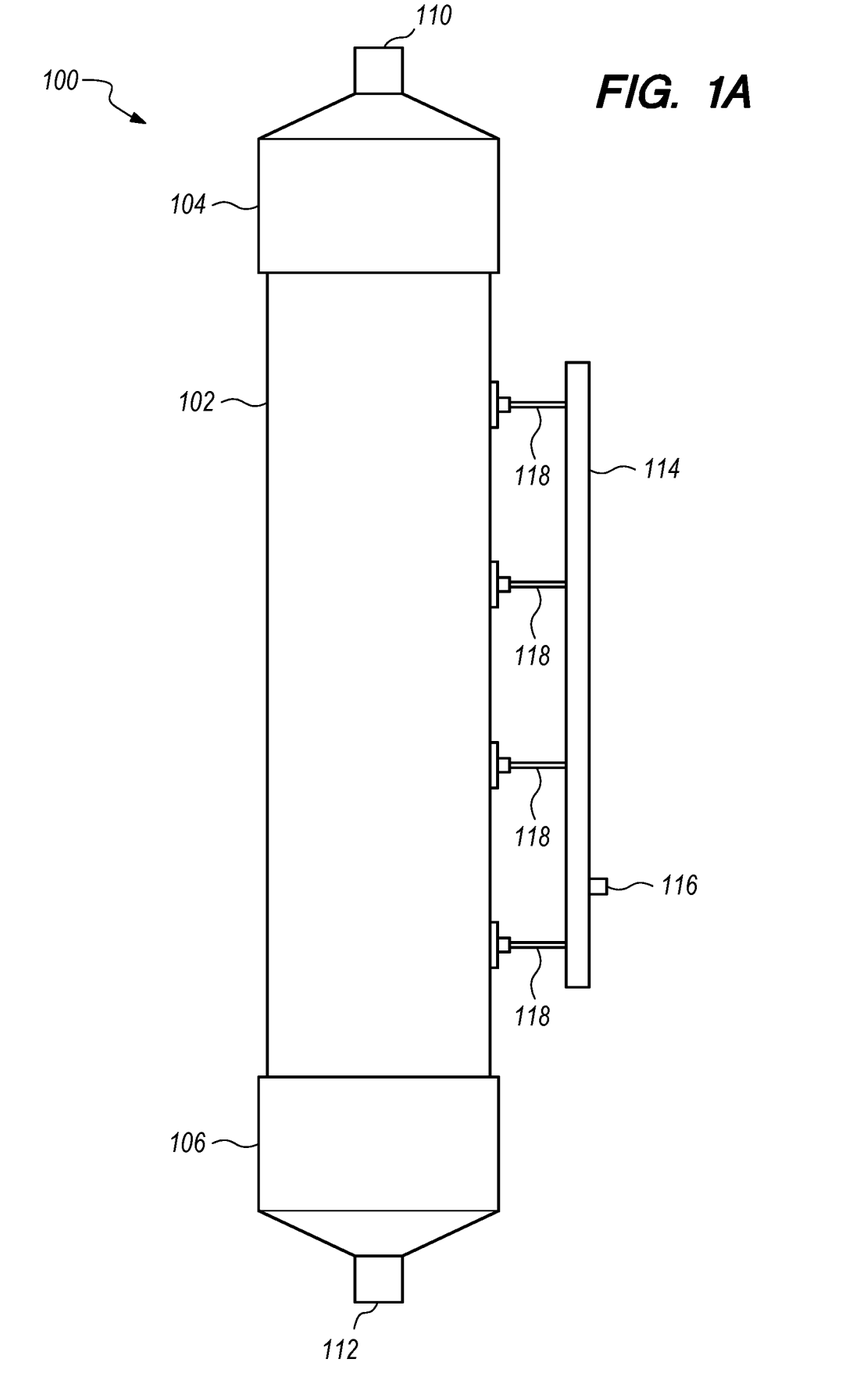
FIGS. 1A-B illustrate a system for infusing gas into a liquid in accordance with an embodiment of the present invention.
Figure 1B:
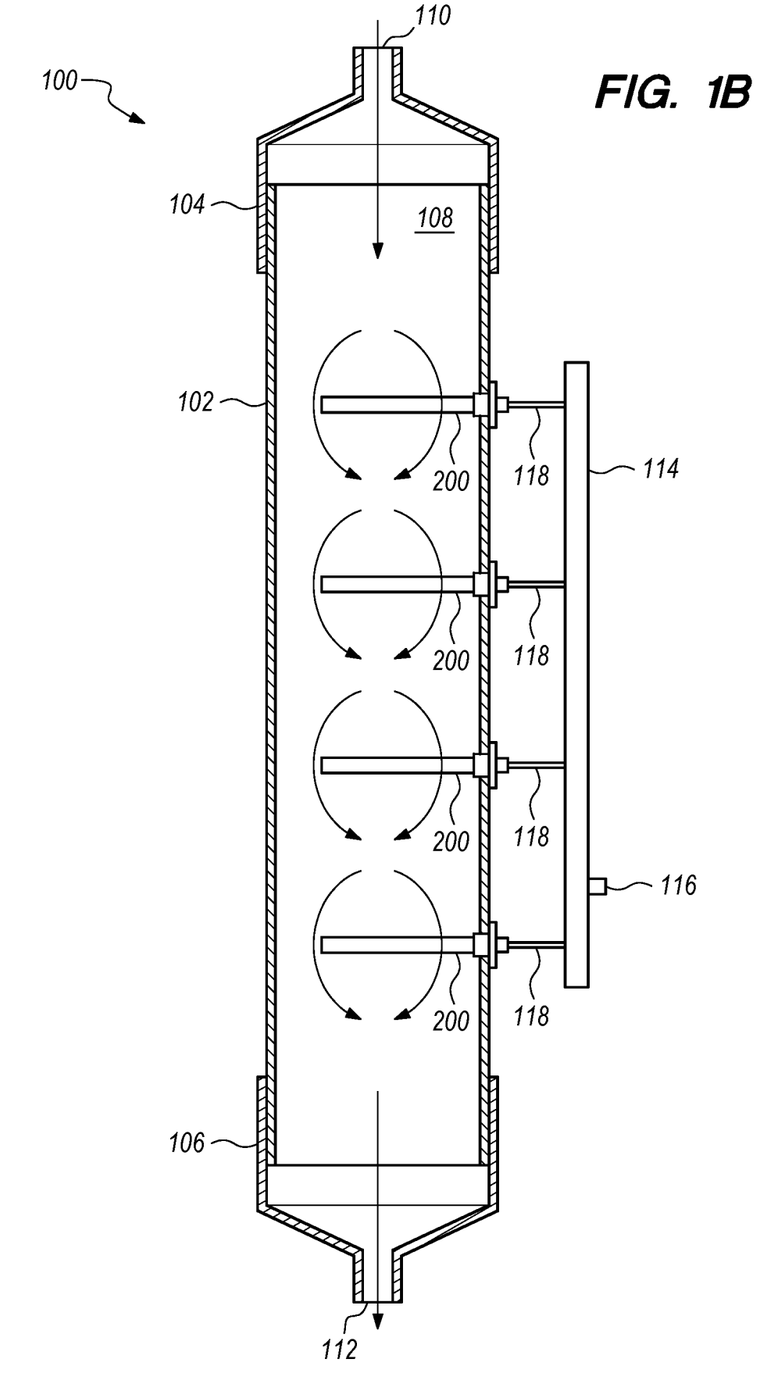

FIGS. 1A-B illustrates a system for infusing gas into a liquid in accordance with an embodiment of the present invention. FIG. 1A shows a side elevation view of the system while FIG. 1B shows a side sectional view of the system. As shown in FIGS. 1A-B, the system includes a fixture 100. The fixture 100 includes a housing 102 having a first end cap 104 and a second end cap 106. Within the housing 102 is a hollow cavity 108. In this example, the housing 102 is tubular and can be constructed of a hollow plastic or metal tube, though it will be apparent that other materials, or a combination of materials, can be used. In the case of a plastic tube, the end caps 104, 106 can be, for example, permanently bonded to the tube. In the case of a metal tube, the end caps 104, 106 can be, for example, welded to the tube or attached with clamps.

An opening 110 in the first end cap 104 is provided for introducing liquid (or fluid) into the fixture 100. An opening 112 in the second end cap 106 is provided for discharging the liquid (or fluid) from the fixture. Arrows in FIG. 1B show generally the direction of liquid flow within the fixture.

Also shown in FIGS. 1A-B are a number of modular devices 200 (also shown in more detail in FIGS. 2A-B and 3A-E). While four such devices 200 are shown in FIGS. 1A-B, the fixture 100 may be equipped with as few as one such device 200 or any suitable number of devices 200 so as to achieve a desired level of gas dissolution in the liquid. The devices 200 are preferably removably mounted to the fixture 100.

Also shown in FIGS. 1A-B is a means for delivering gas into the modular devices 200. In this example, a gas manifold 114 is provided to deliver gas to the devices 200. The manifold 114 is equipped with a gas inlet 116 and a number of gas outlets 118. A gas outlet is connected to each device 200. Rather than a manifold, a plurality of gas hoses can be used to deliver the gas to the devices 200.

Figure 2A:
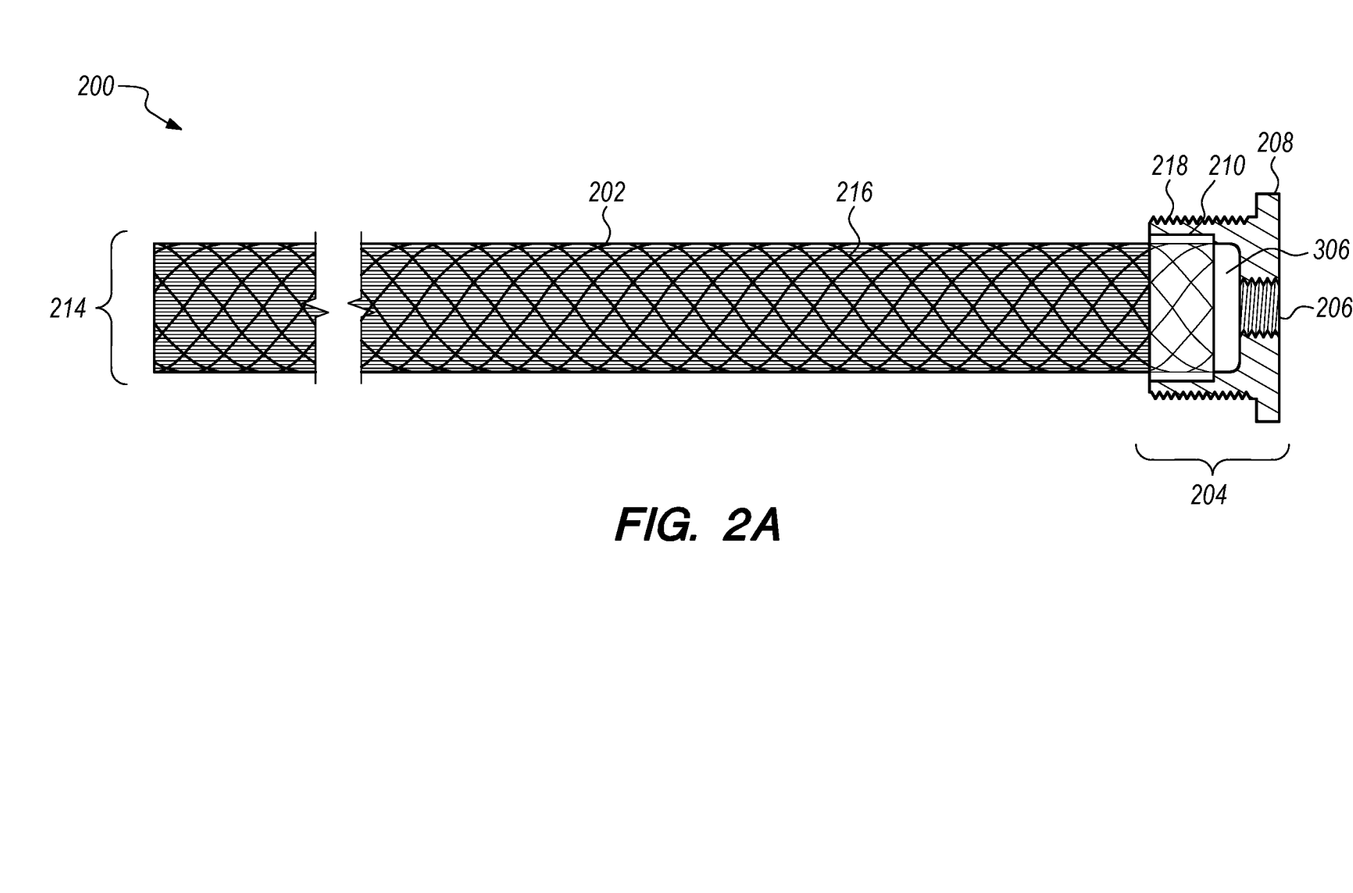
FIGS. 2A-B illustrate a modular device for infusing gas into a liquid in accordance with an embodiment of the present invention.
Figure 2B:
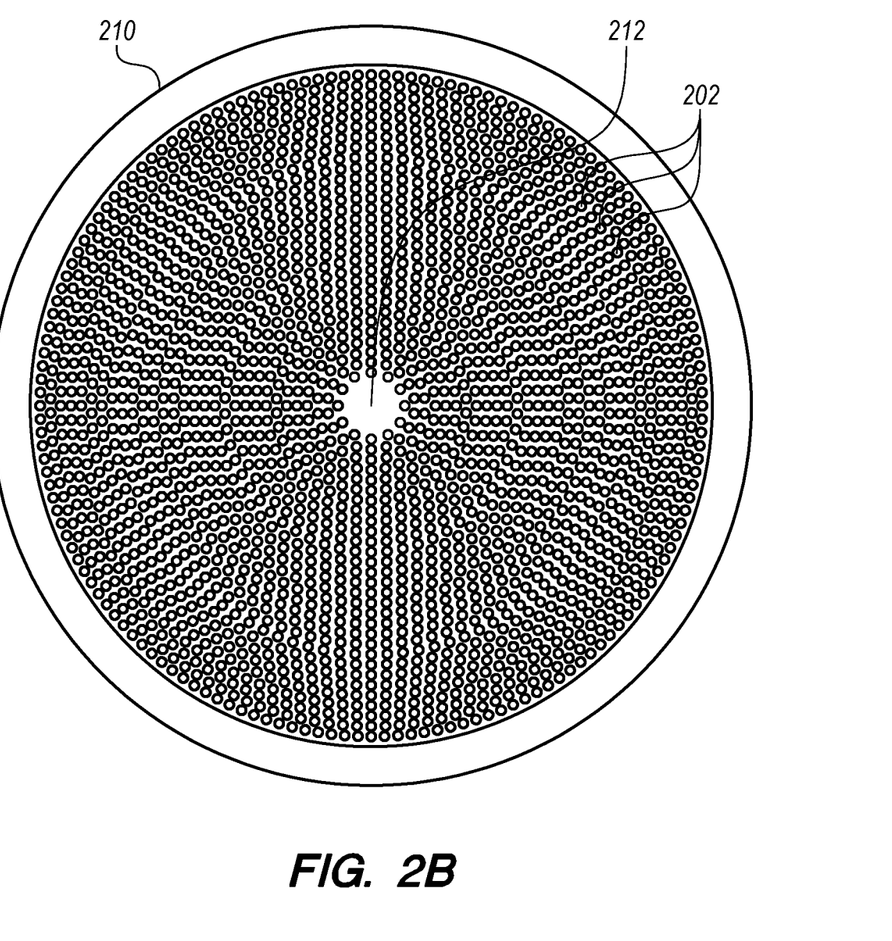

FIGS. 2A-B illustrates a modular device 200 for infusing gas into a liquid in accordance with an embodiment of the present invention. FIG. 2A shows a side elevation view of the device 200 while FIG. 2B shows a cross-sectional view. Referring to FIG. 2A, the device 200 is composed of a plurality of microporous hollow fibers 202 and a cap 204. The cap 204 covers open ends of the microporous hollow fibers 202. The cap 204 is equipped with an opening 206 and is configured to receive a gas into the opening 206 and to deliver the gas into the open ends of the microporous hollow fibers 202. More particularly, the cap 204 may be composed of an outer cap 208 and an inner cylindrical sleeve 210 that encircles the microporous hollow fibers 202. FIG. 2B shows a cross-sectional view of the device 200, including the inner sleeve 210, however, the outer cap 208 is not shown in FIG. 2B. Referring to FIG. 2B, a potting compound 212, such as epoxy, can be used to hold the microporous hollow fibers 202 in place within the sleeve 210.

The microporous hollow fibers 202 may be folded or looped such that both ends of the fibers are open and covered by the cap 204. Alternatively, ends 214 of the microporous hollow fibers that are opposite to those covered by the cap may be sealed or otherwise closed. In either case, all of the open ends are preferably covered by the cap 204. The microporous hollow fibers 202 may be bundled together within a mesh sleeve 216. The sleeve 216 may help to prevent damage to the microporous hollow fibers 202 during use and when the device 200 is inserted and removed from the fixture 100 (FIGS. 1A-B).

The opening 206 in the cap 204 may be equipped with internal threads (which may be tapered), a quick connect fitting or some other type of fitting that allows a gas hose, pipe, conduit or manifold to be connected to the device 200 for delivering gas into the microporous hollow fibers 202. Such a fitting should provide a gas seal to prevent escape of gas from the system. The cap 204 may also be equipped with external threads 218 so as to allow the device 200 to be removably mounted to the fixture 100 (FIGS. 1A-B). Alternatively, the device 200 can be equipped with a quick connect fitting or some other type of fitting that allows the device 200 to be removably mounted to the fixture 100. Such a fitting should provide a liquid seal to prevent escape of liquid from the system. The fixture 100 is preferably equipped with corresponding fittings to those of the device 200, (e.g., threaded or quick connect) so that the device 200 can be easily removed and replaced in the fixture 100.

Figure 3A:
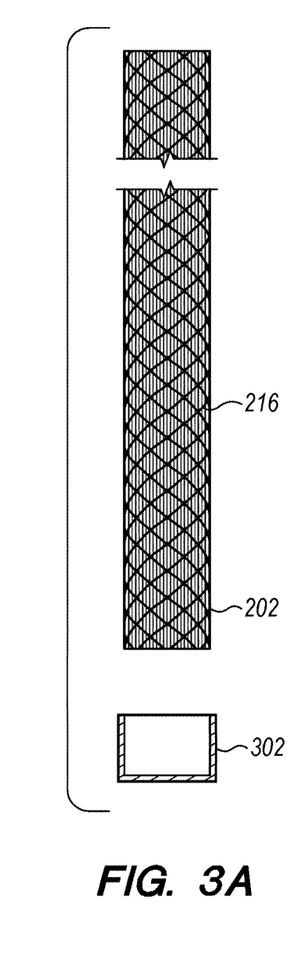
FIGS. 3A-E illustrate a process of manufacturing a modular device for infusing gas into a liquid in accordance with an embodiment of the present invention.

FIGS. 3A-E illustrate a process of manufacturing a modular device for infusing gas into a liquid in accordance with an embodiment of the present invention. Referring to FIG. 3A, a plurality of the microporous hollow fibers 202 are obtained. The microporous hollow fibers 202 are preferably arranged in a bundle and surrounded by the mesh 216. Additionally, an inner cap 302 (also referred to herein as a potting cup) is obtained.

Figure 3B:
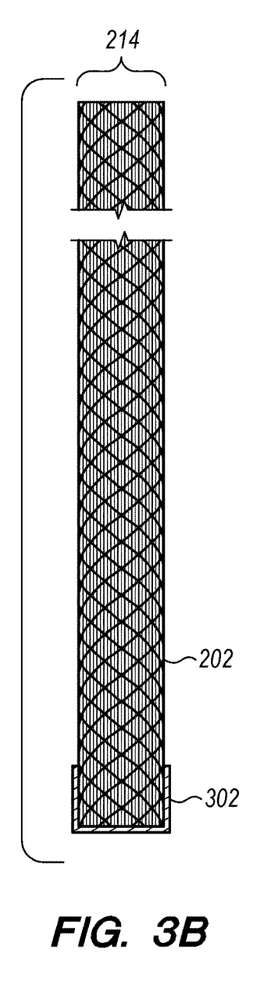
Figure 3C:
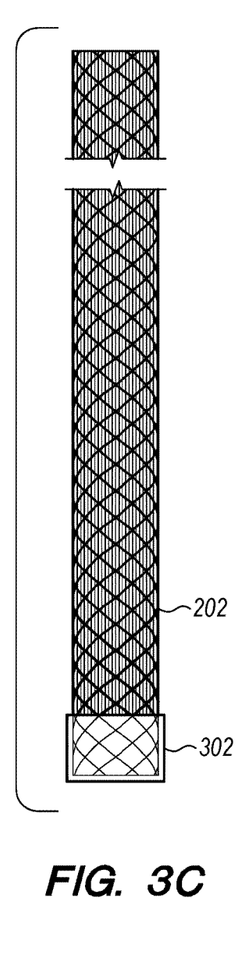

As shown in FIGS. 3B-C, ends of the microporous hollow fibers 202 are inserted into the potting cup 302. In FIG. 3B, the potting cup 302 is shown cut away (in sectional view) for illustrative purposes such that the ends of the microporous hollow fibers 202 can be seen within the potting cup 302. The microporous hollow fibers 202 may be folded or looped such that both ends of the fibers are inserted into the potting cup 302. Alternatively, ends 214 of the microporous hollow fibers that are opposite to those inserted into the potting cup 302 may be sealed or otherwise closed. In either case, all of the open ends are preferably inserted into potting cup 302. In FIG. 3C, the potting cup 302 is shown not cut away such that the ends of the microporous hollow fibers 202 are obscured by the potting cup 302.

Potting compound can then be added into the potting cup 302. This is preferably performed such that the potting compound fills any voids between the fibers 202, secures the mesh sleeve 216 and the fibers 202 to each other and to the potting cup 302. The potting compound can be for example, epoxy or other suitable material. The potting compound is preferably added after the fibers 202 and mesh 216 are inserted into the potting cup 302 though the potting compound can alternatively be added to the potting cup 302 before the fibers 202 and mesh 216 are inserted.

Figure 3D:
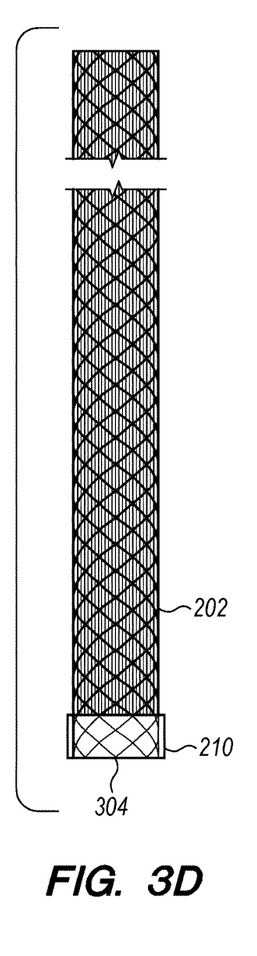

A portion of the potting cup 302 and ends of the fibers 202 are then removed to expose open ends 304 of the microporous hollow fibers 202. This can be accomplished by cutting through the potting cup 302 and fibers 202. The result after the removal is shown in FIG. 3D. Referring to FIG. 3D, a remaining portion of the potting cup 302 (also referred to herein as the inner sleeve 210) surrounds the microporous hollow fibers 202. This step ensures that the ends of the fibers 202 are open for receiving gas and are not clogged with potting compound or some other substance.

Figure 3E:
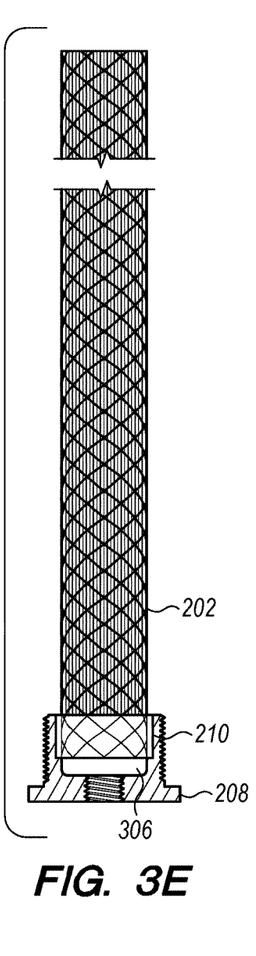

The remaining portion of the potting cup 302 is then attached to a means for removably mounting the modular device to a fixture. This can be accomplished by inserting sleeve 210 into an outer cap 208 (also shown in FIGS. 1A-B). The outer cap 208 can be, for example, press-fit or glued to the sleeve 210 so that they are permanently mated together. FIG. 3E shows the sleeve 210 after having been inserted into the outer cap 208. Also shown in FIG. 3E is the opening 206 in the cap 208 for receiving gas into the device 200. In an embodiment, a cavity 306 is present between the outer cap 208 and the cut ends of the fibers 202. This cavity 306 provides a pathway for gas received into the opening 206 to enter the open ends of the fibers 202.

Figure 4A:
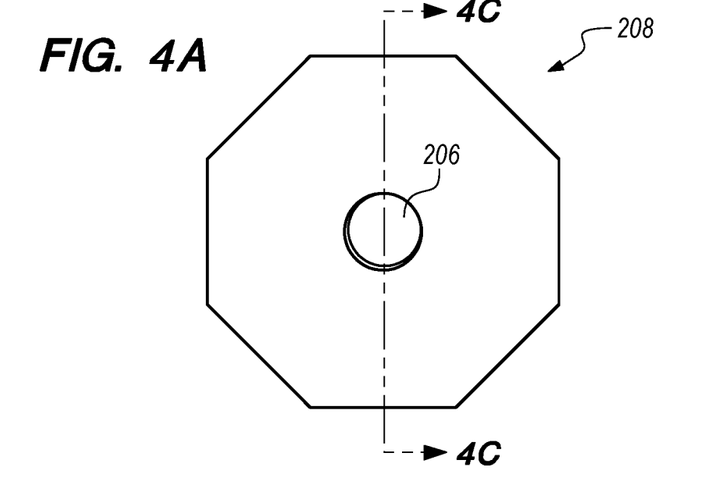
FIGS. 4A-C illustrate a cap component of a modular device for infusing gas into a liquid in accordance with an embodiment of the present invention.
Figure 4B:
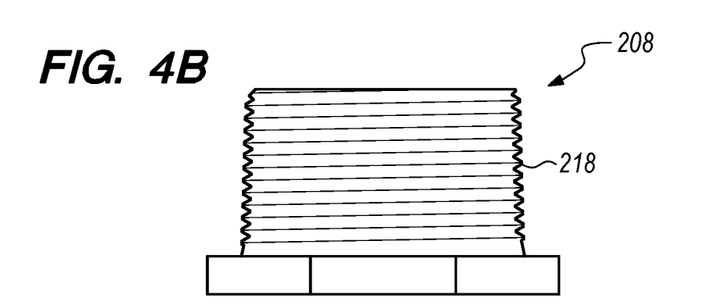
Figure 4C:
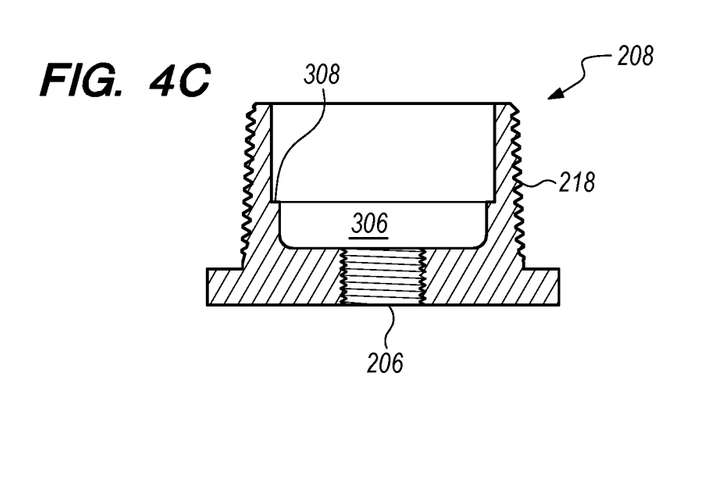

FIGS. 4A-C illustrate a cap component of a modular device for infusing gas into a liquid in accordance with an embodiment of the present invention. More particularly, FIG. 4A shows a top view of the outer cap 208, while FIG. 4B shows a side view of the cap 208. FIG. 4C shows a side sectional view through a section 4C-4C shown in FIG. 4A. FIGS. 4A and 4C show the opening 206. FIG. 4B shows the threads 218. As is also shown in FIGS. 4A-B, the cap 208 may have a hexagonal shape so that the cap 208 can be tightened and loosened with a wrench for mounting in the fixture 100. FIG. 4C illustrates the cavity 306 which is connected to the opening 206 for allowing gas to enter the cap 208 and to enter the microporous hollow fibers 202 via the cavity 306. As is also shown in FIG. 4C, the cap 208 may be equipped with a shoulder 308. The shoulder 308 may engage with the sleeve 210 when the sleeve 210 is inserted into the cap 208 so as to provide a positive stop for the sleeve 210 and to aid with sealing the cap 208 and sleeve 210 together.

Figure 5:
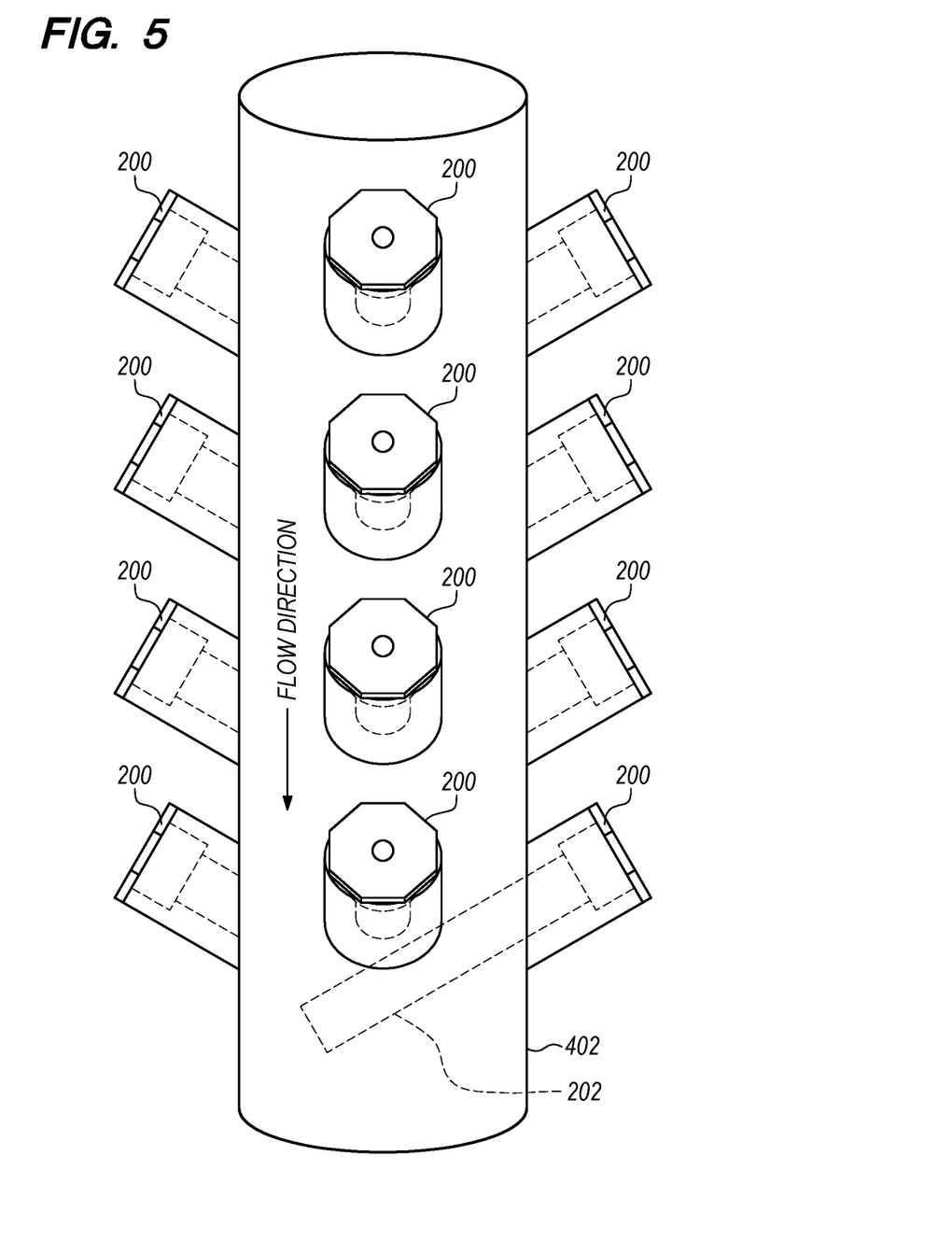
FIG. 5 illustrates an alternative system for infusing gas into a liquid in accordance with an embodiment of the present invention.

FIG. 5 illustrates an alternative system for infusing gas into a liquid in accordance with an embodiment of the present invention. The system of FIG. 5 is similar to that of Figures IA-B except that the housing 402 of FIG. 5 is configured to accept twelve of the modular devices 200. Additionally, FIG. 5 shows that the modules 200 are mounted such that a longitudinal axis of the modules 200 is at an angle of less than 90 degrees with outer walls of the housing (unlike the system of Figures IA-B in which a longitudinal axis of the devices 200 are mounted at 90 degrees with respect to walls of the housing). The housing 402 may be equipped with end caps as in FIGS. 1A-B though they are not shown in FIG. 5.

Figure 6:
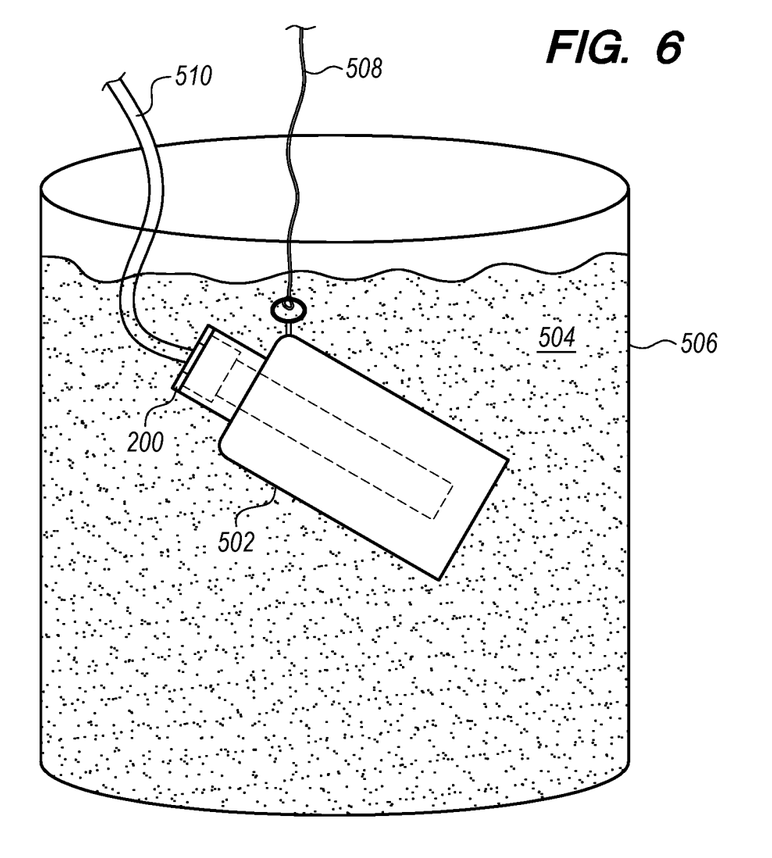
FIG. 6 illustrates a submersible system for infusing gas into a liquid in accordance with an embodiment of the present invention.

FIG. 6 illustrates a submersible system for infusing gas into a liquid in accordance with an embodiment of the present invention. As shown in FIG. 6, a modular device 200 is removably mounted to a submersible fixture 502. The device 200 and submersible fixture 502 can be submerged in a liquid 504 within a container 506. In this example, the submersible fixture 502 is tubular or cylindrical and is configured to accommodate mounting of a single device 200 at one end of the tube or cylinder. The submersible fixture 502 is preferably gas and liquid permeable. For example, the fixture can be comprised of mesh or perforated material. Additionally, an end opposite to the one in which the device 200 is mounted can be open or covered with mesh or perforated material. An assembly of the submersible fixture 502 and the device 200 mounted thereto is preferably heavier than the liquid displaced so that the assembly sinks rather than floats in the liquid. Weights can be added to achieve this. A tether 508 can be used to suspend the assembly within the container 506. Also shown in FIG. 6, a hose 510 can be connected to the device 200 for providing gas to the device 200.

In operation, liquid 504 in the container 506 comes in contact with the microporous hollow fibers of the device 200 and becomes infused with gas received via the hose 510. The liquid will tend to circulate through the permeable walls of the fixture and within the container 506 due to the gas infusion action, as well as due to other influences, such as filling and emptying of the container 506.

It will be apparent that other shapes of submersible fixtures can be utilized and that the submersible fixture 502 can be configured to accommodate a plurality of modules 200.

Figure 7:
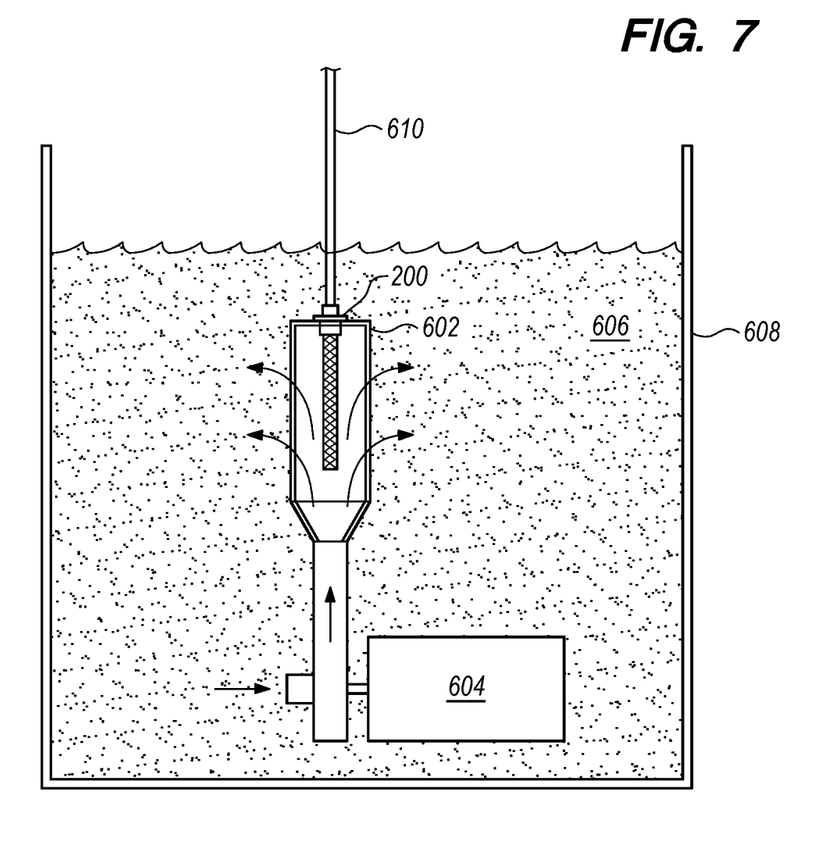
FIG. 7 illustrates an alternative submersible system for infusing gas into a liquid in accordance with an embodiment of the present invention.

FIG. 7 illustrates an alternative submersible system for infusing gas into a liquid in accordance with an embodiment of the present invention. As shown in FIG. 7, a modular device 200 is removably mounted to a submersible fixture 602. The submersible fixture 602 is mounted to the outlet of a submersible agitation pump 604. An assembly which includes the device 200, the submersible fixture 602 and the pump 604 can be submerged in a liquid 606 within a container 608. In this example, the submersible fixture 602 is tubular and is configured to accommodate mounting of a single device 200 at one end of the tube. The outlet of the pump 604 is mounted to the other end of the tubular structure of the fixture 602. The submersible fixture 502 is preferably gas and liquid permeable. For example, the fixture can be comprised of mesh or perforated material. Also shown in FIG. 6, a hose 610 can be connected to the device 200 for providing gas to the device 200. In operation, the pump 604 draws liquid from the container 608 and directs the liquid into the end of the fixture 602 where it encounters the device 200 and becomes infused with gas received via the hose 610. The infused gas can then exit the fixture 602 though the mesh or perforated walls of the fixture 602 and mix with liquid in the container 608. Arrows in FIG. 7 show generally the direction of liquid flow within the fixture 602. It will be apparent that other shapes of submersible fixtures can be utilized and that the submersible fixture 602 can be configured to accommodate a plurality of modules 200. Additionally, it will be apparent that the pump 604 or a portion of the pump 604, such as its motor, can be mounted outside of the container 608.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A modular system for infusing gas into liquid comprising:
   a fixture, wherein the fixture comprises a hollow cavity, a first opening configured to receive the liquid, a second opening configured to a discharge gas-infused liquid and a plurality of receptacles; and
   a plurality of modules configured to be removably mounted to the receptacles of the fixture and each module comprising at least one microporous element having an open end and a cap configured to receive the gas and to deliver the gas into the open end of the at least one microporous element, wherein each module is insertable into the fixture such that the at least one microporous element is at least partially within the hollow cavity and such that the opening configured to receive the gas is accessible from outside the hollow cavity, and the cap of each module being configured to removably mount the module to the fixture.

2. The modular system according to claim 1, wherein the plurality of receptacles comprise a threaded fitting.

3. The modular system according to claim 1, wherein the plurality of receptacles comprise a quick connect fitting.

4. The modular system according to claim 1, further comprising a manifold configured to deliver the gas to the opening of the cap of each of the plurality of modules.

5. The modular system according to claim 1, wherein the fixture further comprises a housing comprising the hollow cavity, a first end cap comprising the first opening and a second end cap comprising the second opening.

6. The modular system according to claim 1, wherein the at least one microporous element of the plurality of modules comprises a plurality of microporous hollow fibers and wherein the cap of each module covers open ends of the microporous hollow fibers and the cap being configured to receive to deliver the gas into the open ends of the microporous hollow fibers in order to infuse the gas into the liquid when the liquid is in contact with the hollow fibers.

7. The modular device according to claim 6, wherein the microporous hollow fibers are looped such that the cap covers two open ends of each of the microporous hollow fibers.

8. The modular system according to claim 6, further comprising a potting compound configured to adhere the microporous hollow fibers to the cap.

9. The modular system according to claim 8, wherein the cap comprises a sleeve that surrounds the open ends of the fibers wherein the potting compound adheres the microporous hollow fibers to the sleeve.

10. The modular system according to claim 1, the fixture and the cap providing a liquid and gas seal such that the gas can achieve a greater pressure than that of the liquid.

11. The modular system according to claim 10, further comprising a gas pressure regulator.

12. A modular system for infusing gas into liquid comprising:
    a fixture, wherein the fixture comprises a hollow cavity capable of containing the liquid, a first opening configured to receive the liquid, a second opening configured to discharge a gas-infused liquid and a plurality of receptacles; and
    a plurality of modules configured to be removably mounted to the receptacles of the fixture and each module comprising a plurality of microporous hollow fibers and a cap covering open ends of the microporous hollow fibers and the cap being configured to receive the gas into an opening and to deliver the gas into the open ends of the microporous hollow fibers in order to infuse the gas into the liquid when the liquid is in contact with the hollow fibers, wherein each module is insertable into the fixture such that the microporous hollow fibers are at least partially within the hollow cavity and such that the opening configured to receive the gas is accessible from outside the hollow cavity.

13. The modular system according to claim 12, the cap being configured to removably mount the modular device to the fixture.

14. The modular system according to claim 13, the cap providing a liquid and gas seal such that the gas can achieve a greater pressure than that of the liquid.

15. The modular system according to claim 14, further comprising a gas pressure regulator.

16. The modular system according to claim 13, further comprising a potting compound configured to adhere the microporous hollow fibers to the cap.

17. The modular system according to claim 16, wherein the cap of the modular device comprises a sleeve that surrounds the open ends of the fibers wherein the potting compound adheres the microporous hollow fibers to the sleeve.

18. The modular system according to claim 13, wherein the cap comprises tapered threads for removably mounting the modular device to the fixture.

19. The modular system according to claim 13, wherein the cap comprises a quick connect fitting for removably mounting the modular device to the fixture.

20. The modular system according to claim 13, wherein the microporous hollow fibers are looped such that the cap covers two open ends of each of the microporous hollow fibers.

21. The modular system according to claim 12, further comprising a manifold configured to deliver the gas to the opening of the cap of each of the plurality of modules.

* * * * *